US012291414B2

(12) United States Patent
Mazzinghi

(10) Patent No.: US 12,291,414 B2
(45) Date of Patent: May 6, 2025

(54) UNWINDING UNIT AND METHOD FOR UNWINDING A STRIP OF HEAT SEALING MATERIAL FOR FORMING BOXES FROM BLANKS

(71) Applicant: EMMECI S.P.A., Cerreto Guidi (IT)

(72) Inventor: Mauro Mazzinghi, Castana (IT)

(73) Assignee: EMMECI S.P.A., Cerreto Guidi (IT)

( * ) Notice: Subject to any disclaimer, the term of this patent is extended or adjusted under 35 U.S.C. 154(b) by 582 days.

(21) Appl. No.: 15/415,230

(22) Filed: Jan. 25, 2017

(65) Prior Publication Data

US 2017/0217117 A1 Aug. 3, 2017

(30) Foreign Application Priority Data

Jan. 29, 2016 (IT) ........................ 102016000009423

(51) Int. Cl.
*B65H 20/02* (2006.01)
*B31B 50/44* (2017.01)
(Continued)

(52) U.S. Cl.
CPC ............. *B65H 20/02* (2013.01); *B31B 50/44* (2017.08); *B31B 50/72* (2017.08); *B65H 23/16* (2013.01);
(Continued)

(58) Field of Classification Search
CPC ....... B31B 50/72; B31B 50/44; B31B 50/726; B31B 2100/00; B31B 2100/0024; B31B 2110/35; B31B 50/26; B31B 50/724; B31B 2110/30; B31B 2120/502; B65H 20/02; B65H 23/16; B65H 23/28
(Continued)

(56) References Cited

U.S. PATENT DOCUMENTS 1,714,265 A * 5/1929 Gurwick .................. B41M 1/30
101/424.2
3,552,279 A 1/1971 Turner
(Continued)

FOREIGN PATENT DOCUMENTS

EP 1609585 A1 12/2005
IT BO2011A000265 11/2011
(Continued)

*Primary Examiner* — Sameh Tawfik
(74) *Attorney, Agent, or Firm* — Chrisman Gallo Tochtrop LLC

(57) ABSTRACT

An unwinding unit (400) for unwinding a strip (S) of heat sealing material for quadrangular machines (1) comprises a casing (401) adapted to be mounted on a quadrangular machine (1) and a puller (402) operatively associated with the casing (401) and configured to pull the strip (S) relative to the casing (401) along a feed path (P) and in a feed direction (V). A diverter (407) is configured to divert the strip (S) between an initial, preferably horizontal, stretch (P1) of the feed path and a final, substantially vertical stretch (P2) of the feed path, defining a curved, connecting stretch (P3) between the initial stretch and the final stretch. A deformer (413) operatively associated with the casing (401) are configured to make on the strip (5) an extended crease line (414) running along the strip itself starting from the curved stretch (P3) or downstream of the curved stretch (P3), in the feed direction (V) of the strip (S).

16 Claims, 9 Drawing Sheets

(51) Int. Cl.

| | |
|---|---|
| ***B31B 50/72*** | (2017.01) |
| ***B65H 23/16*** | (2006.01) |
| ***B65H 23/28*** | (2006.01) |
| *B31B 50/26* | (2017.01) |
| *B31B 100/00* | (2017.01) |
| *B31B 110/30* | (2017.01) |
| *B31B 110/35* | (2017.01) |
| *B31B 120/00* | (2017.01) |

(52) U.S. Cl.
CPC .............. *B65H 23/28* (2013.01); *B31B 50/26* (2017.08); *B31B 50/724* (2017.08); *B31B 50/726* (2017.08); *B31B 2100/00* (2017.08); *B31B 2100/0024* (2017.08); *B31B 2110/30* (2017.08); *B31B 2110/35* (2017.08); *B31B 2120/502* (2017.08)

(58) Field of Classification Search
USPC .......................................................... 493/394
See application file for complete search history.

(56) References Cited

U.S. PATENT DOCUMENTS

| | | | | | |
|---|---|---|---|---|---|
| 3,967,767 | A * | 7/1976 | Seragnoli | B65B 41/16 | 225/96 |
| 5,071,401 | A * | 12/1991 | Bertsch | B31B 50/00 | 118/249 |
| 5,090,616 | A * | 2/1992 | Bertsch | B31B 50/00 | 229/132 |
| 5,103,617 | A * | 4/1992 | Sjogren | B65B 11/08 | 53/131.5 |
| 5,558,611 | A * | 9/1996 | Focke | B31B 50/00 | 493/162 |
| 5,725,721 | A * | 3/1998 | Yeh | B65B 51/06 | 156/468 |
| 8,857,600 | B2 * | 10/2014 | Huang | B65G 47/66 | 198/600 |
| 9,205,681 | B2 * | 12/2015 | Horaguchi | B65H 23/16 | |
| 2016/0067936 | A1 * | 3/2016 | Mazzinghi | B31B 50/00 | 493/133 |

FOREIGN PATENT DOCUMENTS

| | | | |
|---|---|---|---|
| JP | S02013485 | Y | 11/1927 |
| JP | S54-088418 | A | 7/1979 |
| JP | S60-159764 | A | 8/1985 |
| JP | S60-159764 | U | 10/1985 |
| JP | H03-063553 | U | 6/1991 |
| JP | H06-069684 | A | 3/1994 |
| JP | 2005-313372 | A | 11/2005 |
| JP | 2008-081258 | A | 4/2008 |
| WO | 2014177947 | A1 | 11/2014 |

* cited by examiner

UNWINDING UNIT AND METHOD FOR UNWINDING A STRIP OF HEAT SEALING MATERIAL FOR FORMING BOXES FROM BLANKS

BACKGROUND OF THE INVENTION

This invention relates to an unwinding unit and method for unwinding a strip of heat sealing material for forming boxes from blanks.

The disclosure also relates to a quadrangular machine to form boxes from blanks made of paper (with the expression "paper" it is meant in particular "paperboard") or cardboard and having a base and a plurality of segments connected to the base and to a method for forming a cardboard box from a flat blank.

The invention relates to the technical field of industrial processing for forming finely finished, premium boxes, in particular cardboard boxes known as "sharp edged" boxes.

The boxes in question are made from specially shaped sheets of paper or cardboard, known as forming blanks.

More specifically, the flat blanks consist of a base and a plurality of faces or segments connected to the base and designed to be folded relative to the base to form the side wall of the box.

The industrial process leading to the finished box comprises two distinct stages: a stage of forming the box (starting from the forming blank), followed by a stage of covering the box by applying a coating (or covering) sheet to it.

This invention falls within the context of the stage of forming the box.

Prior art machines which perform the above mentioned box forming stage, generally known as "quadrangular machines" are equipped with a die designed to be coupled to the inside surface of the box. These machines comprise folding means configured to cooperate with the die in such a way as to fold the forming blank by juxtaposing the free segments of the forming blank in order to give the box the desired shape.

These machines are also equipped with a plurality of heat sealing heads which are movable relative to the box and configured to apply a strip of heat sealing material to the open edges defined by the free adjacent segments in order to hold them together stably.

The box thus made has, at the zone where the heat sealing strip is applied, an unattractive indentation. Generally speaking, in premium boxes, this constitutes an unacceptable surface defect.

Indeed, a strongly felt need is that of being able to apply the heat sealing strip to the box without creating evident surface imperfections.

In this context, in the attempt to prevent the indentation from being formed, a sealing strip of reduced thickness has been tentatively used in prior art machines.

One of the difficulties involved in doing this, however, is to apply the strip correctly along the corner edges of the box. In effect, it was found that, on account of the reduced thickness, the heat sealing strip tends to bend and/or swing while it is being fed and is therefore incorrectly positioned—relative to the corner edge of the box—during heat sealing by the heat sealing means.

To overcome this problem, the Applicant of this invention proposed to deform the strip in the initial stretch of its feed path, as described in patent application BO2011A000265. It was found, however, that deforming the strip in this way impacted negatively on the feed system and cancelled the advantages brought by the idea of deforming the strip.

In another attempt to overcome this problem, the machine was modified in such a way that the box being formed could be moved translationally relative to the strip, thereby dividing the heat sealing operation into two steps, as described for example in WO2014/177947 in the name of the Applicant of this invention. This type of machine, however, is complex and difficult to adjust, particularly during changeover to a different box size.

SUMMARY OF THE INVENTION

This invention has for an aim to overcome the above mentioned problems.

This disclosure has for aim to provide an unwinding unit and an unwinding method which allow making premium boxes of high aesthetic quality by applying a particularly thin heat sealing strip and without introducing structural and/or operational complications.

Another aim of this disclosure is to provide a quadrangular machine and a forming method which allow overcoming the above mentioned drawbacks and, in particular, which allow easy application of a particularly thin heat sealing strip which is free of unwanted deformation.

These aims are fully achieved by the unwinding unit and unwinding method of this disclosure as characterized in the appended claims.

According to a first aspect, the aim is achieved by an unwinding unit comprising a casing adapted to be mounted on a quadrangular machine and a puller (i.e. pulling means) configured to pull a strip of heat sealing material along a feed path and in a feed direction. A diverter (i.e. diverting means is configured to divert the strip between an initial, preferably horizontal, stretch and a final, substantially vertical stretch of the feed path. Between the initial stretch and the final stretch there is a curved, connecting stretch.

Advantageously, a deformer (i.e. deforming means) is provided which is operatively associated with the casing and configured to make on the strip an extended crease line running along the strip itself starting from the curved stretch or downstream of the curved stretch, in the feed direction of the strip.

Deforming the strip starting from the curved stretch makes it possible to use thin strips to make fine quality premium boxes without upsetting the efficiency of the strip feed system and thus without introducing further possible sources of defects in positioning the strip.

Preferably, the deformer comprises a pair of counter-rotating rollers, for example forming part of or constituting the puller. This simplifies the structure of the unit, providing a compact unit which is easy to mount to the machine, and optimizes the deforming and feeding stage.

Preferably, the deformer comprises a protrusion, for example annular, which can be coupled to a groove, for example annular. The protrusion and the groove interpenetrate each other at the feed path to produce the crease line on the strip. Preferably, the groove and the protrusion are respectively formed on one of the counter-rotating rollers.

Preferably, the deformer is located at the curved stretch of the feed path, and still more preferably, in a transit zone between the initial stretch and the curved stretch to make deforming and pulling the strip even more efficient.

Preferably, the puller comprises a pair of counter-rotating rollers. At least one of the two rollers is power-driven and, preferably, the power-driven roller does not have any axial mouldings, such as knurling for example, to prevent imparting lateral movements to the strip.

Preferably, at least one of the counter-rotating rollers forming part of the puller and/or of the deformer, preferably an idle roller, is mounted to rotate on a fork comprising two arms which are hinged to the casing of the unwinding unit on opposite sides of the casing itself relative to the strip feed path. That way, the roller is balanced and the force applied thereto is symmetrical so as eliminate even the smallest sources of possible strip misalignment relative to the unit.

Preferably, the fork is mounted so it has axial play relative to the casing and/or the fork comprises an adjuster structure (i.e. adjusting means), for adjusting the axial position of the roller mounted thereon in order to allow and simplify adjustments relative to the strip being fed. Preferably, the other roller, for example a power-driven roller, is mounted to rotate on the casing and so it has axial play relative to the casing itself in order to adapt to the position of the roller mounted on the fork.

Preferably, at least one spring (or any other elastic means) is provided, which is operatively associated with at least one of the counter-rotating rollers in order to apply a thrust force which keeps them in contact with the strip. For example, the at least one spring is interposed between the fork and the casing.

Preferably, an outfeed guide (i.e. outfeed guide means) is provided which is configured to guide the strip along at least a portion of the final stretch of the feed path and to position a portion of the strip to vertically face the corner edge of the box. For example, the outfeed guide comprises a portion of the casing and a block fixed to the casing in such a way as to define between them a through gap for the passage of the strip extending along the final stretch of the feed path. That way, the outfeed guide is rigidly connected to the casing and allow greater precision in vertically positioning the strip. Further, the through gap can thus have reduced tolerances and a width comparable to that of the strip so as to better guide the strip as it exits the unwinding unit.

Preferably, the portion of the casing and the block are configured to define a through gap which has the shape of a V at least in a middle stretch of it relative to the width of the strip. Preferably, the vertex of the through gap lies at the crease line. That way, the fold made along the strip as it exits the unwinding unit makes the strip even more stable and, thanks to the side guides, without negatively affecting the precision of feed.

Preferably, an infeed guide (i.e. infeed guide means) is provided which is configured to guide the strip along at least a portion of the initial stretch of the feed path and comprise a flat sliding surface, two side containment walls and a cover plate, preferably having at least one slot, positioned in such a way as to define a through gap for the strip extending along the initial stretch of the feed path. Preferably, the through gap has reduced tolerances and a width comparable to that of the strip as to better guide the strip as it enters the unwinding unit. It is thus possible to guarantee that the strip is positioned stably and precisely relative to the deformer. Preferably, the flat sliding surface is machined for improved slidability of the strip.

According to a further aspect, the above mentioned aims are achieved by a quadrangular machine for forming boxes from paper or cardboard blanks having a base and a plurality of segments connected to the base. The machine comprises a folding assembly (i.e. folding means) configured to fold the segments of the blank and set them upright with their lateral edges juxtaposed to define vertical corner edges of the box. Also provided is a plurality of unwinding units to position pieces of strip of predetermined length to face the vertical corner edges.

The machine also comprises a plurality of sealing heads equipped with corresponding pressers, which are heatable and movable towards and away from the box to press the pieces against the respective corner edges. The sealing heads are preferably equipped with corresponding blades which are movable as one with the pressers to cut the strip.

According to a further aspect, the above mentioned aims are achieved by a method for unwinding a strip of heat sealing material suitable for sealing the edges of side segments of a box forming blank juxtaposed to define a corner edge of the box. The method comprises pulling the strip along a feed path and in a feed direction, diverting it between an initial, preferably horizontal stretch, a curved connecting stretch and a final, preferably vertical stretch of the feed path. Advantageously, an extended crease line running along the strip is made on the strip starting from the curved stretch or downstream of the curved stretch, in the feed direction of the strip in order to stiffen the strip without negatively affecting the feed motion.

Preferably, the crease line is made by the very system which feeds the strip and concurrently with the operation thereof in order to optimize the two steps.

Preferably, the strip is folded into a V shape with vertex in the crease line, guiding the strip as it leaves the feed path, in order to further stiffen the strip and guide it while it is being positioned vertically.

Preferably, the position of the crease line relative to the width of the strip can be adjusted so as adapt to different operating conditions and different box sizes.

Preferably, the strip is guided as it enters the feed path in order to guarantee that the crease line will be correctly positioned.

According to a further aspect, the above mentioned aims are achieved by a method for forming a cardboard box from a flat forming blank having a base and a plurality of side segments which can be folded relative to the base in such a way that edges of adjacent side segments define vertical corner edges of a side wall of the box. According to this aspect, the method comprises positioning a portion of the strip of predetermined length vertically to face each of the corner edges, heating and pressing each strip portion against the corresponding corner edge in order to heat seal it to, and thereby close, the corner edge.

BRIEF DESCRIPTION OF THE DRAWINGS

These and other features of the disclosure will become more apparent from the following detailed description of a preferred, non-limiting embodiment of it, with reference to the accompanying drawings, in which.

DESCRIPTION OF THE PREFERRED EMBODIMENTS

Figure 1:
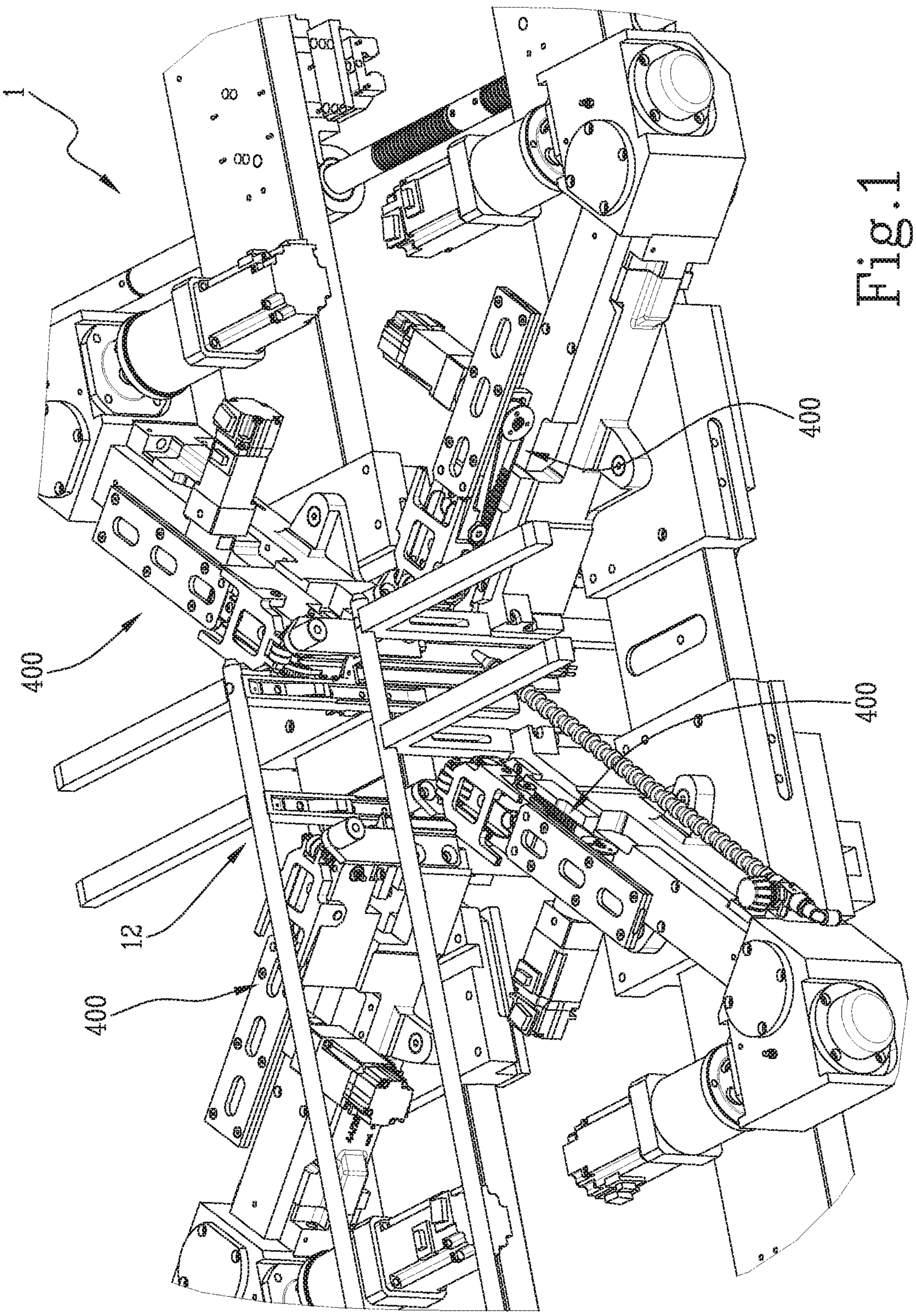
FIG. 1 is a schematic perspective view of a quadrangular machine for forming boxes from paper or cardboard blanks.

The reference numeral 1 in FIG. 1 denotes a quadrangular machine for forming boxes 100 from paper or cardboard blanks 200 having a base 202 and plurality of segments 204.

Figure 9:
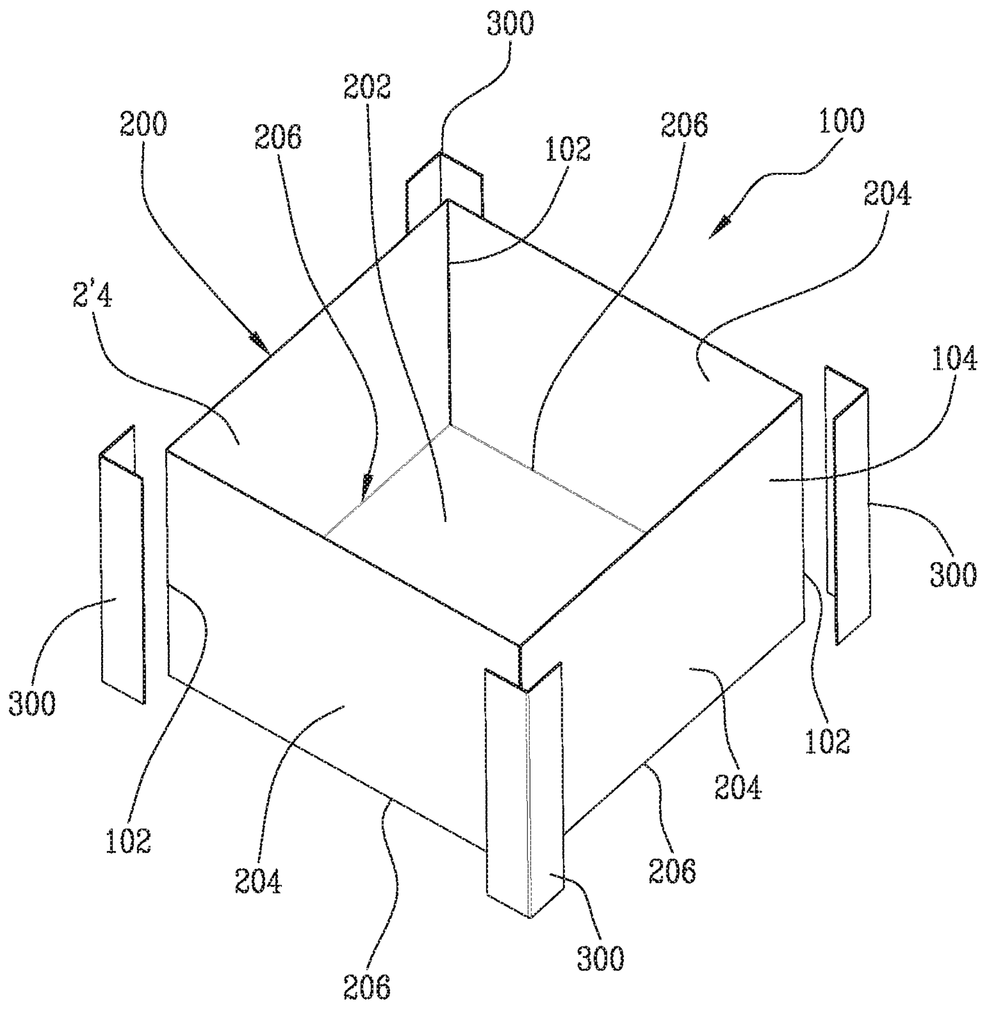
FIG. 9 is a perspective view showing a partly formed box obtainable from the machine of FIG. 1.

FIG. 9 schematically illustrates a box being formed from the blank 200. The segments 204 are connected to the base 202 by lines of weakness 206 to make it easier to fold them relative to the base. More specifically, the segments 204 of the blank 200 can be folded by 90° relative to the base 202 and positioned vertically with their lateral edges juxtaposed to define vertical corner edges 102 of the side wall 104 of the box 100. This folding action is accomplished on the machine 1 by folding means 12.

At each vertical edge 102 of the box to be sealed, a piece 300 of a strip “S” of heat sealing material, hanging from the top down, is provided. The piece 300 is substantially equal in height to the corner edge to be sealed and is applied by the machine 1. Moreover, the strip “S” is a strip of material whose thickness “SP” is particularly reduced, so as not to impact negatively on the aesthetic appearance of the box.

Each piece 300 is fed by an unwinding unit 400 and hence the machine 1 comprises a plurality of unwinding units 400.

Under each unwinding unit, the machine 1 comprises a sealing head and hence the machine 1 comprises a plurality of sealing heads. Each sealing head comprises a presser which is heatable and movable towards and away from the box 100 to press the pieces 300 against the respective corner edges 102. Each sealing head may further comprise corresponding blades which are movable together with the pressers to cut the strip into respective pieces.

Each unwinding unit 400 is, for example, configured to unwind the strip “S” of heat sealing material from a roll of heat sealing material, not illustrated.

Each unwinding unit 400 feeds the strip “S” along a feed path “P” to position a portion of the strip “S” of predetermined length vertically so it faces the corner edge 102 of the box. The piece 300 is cut from this portion of strip.

More specifically, it should be noted that the portion of the strip “S” of predetermined length is free, that is to say, it is not constrained or guided in any way by mechanical parts.

Figure 2:
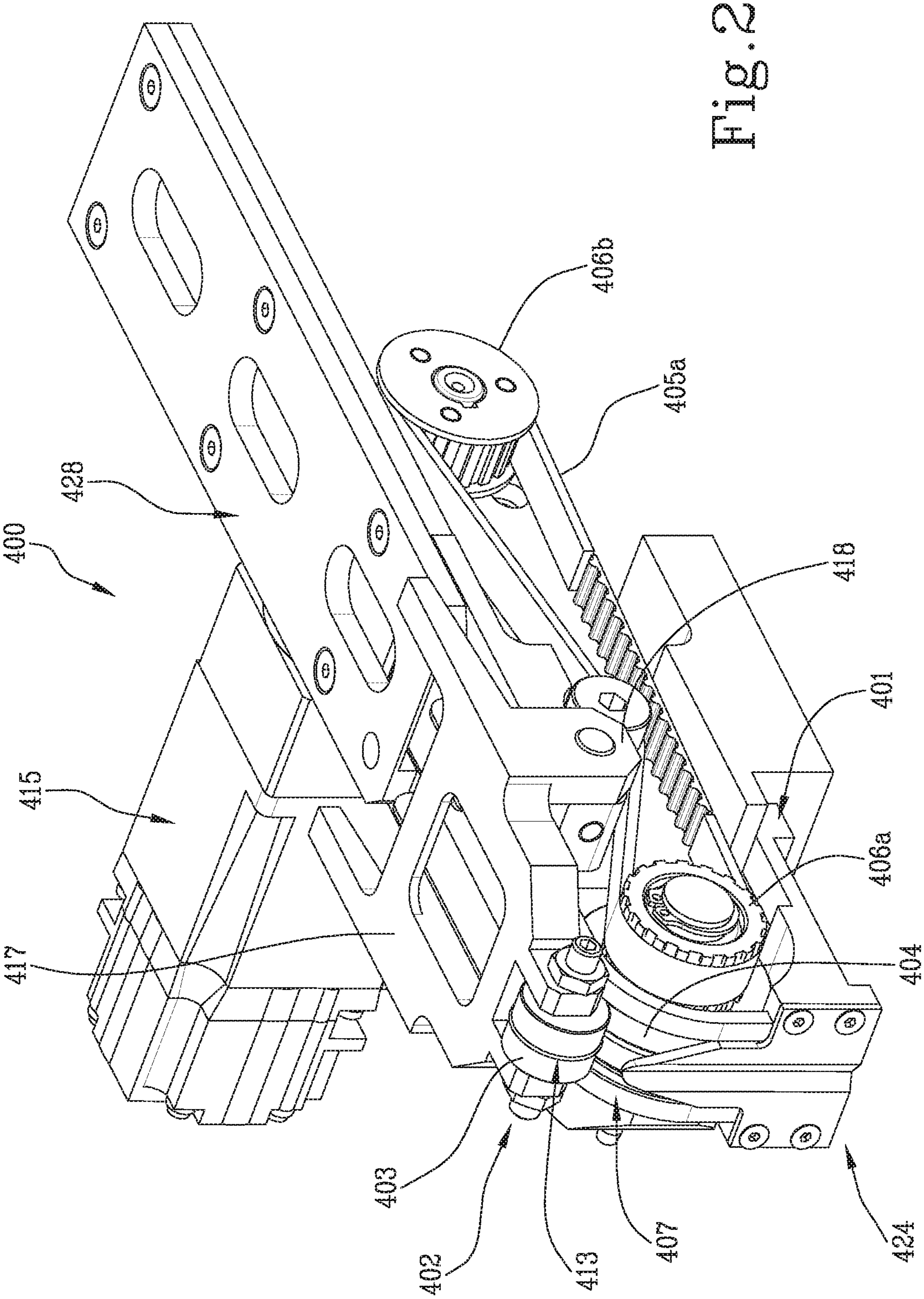
FIG. 2 is a schematic perspective view of an unwinding unit of the machine of FIG. 1.
Figure 3:
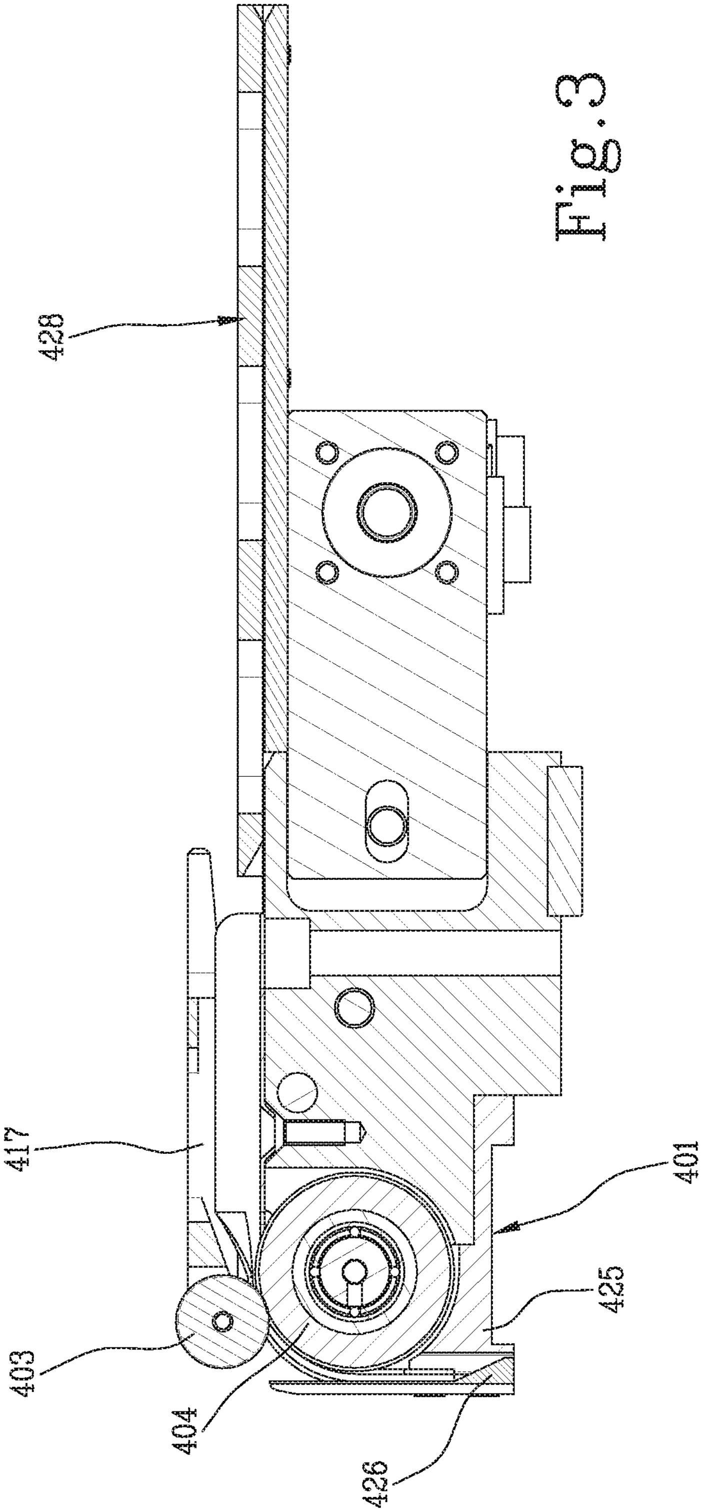
FIG. 3 is a longitudinal cross section of the unwinding unit of FIG. 2.

It should also be noted that the length of the free, unconstrained portion of the strip depends on the height of the box, that is, on the box size being used. The unwinding unit 400 is described below with reference to FIG. 2 and following.

The unwinding unit 400 comprises a casing 401 adapted to be mounted on the machine 1. Operatively associated with the casing 401 a puller 402 is provided, which is configured to pull the strip “S” relative to the casing 401 along the feed path “P” and in a feed direction “V”.

In one embodiment, the puller 402 comprises a pair of counter-rotating rollers 403, 404 mounted with their axes of rotation transverse to the feed path “P” and respectively on opposite sides of the feed path “P” in such a way as to apply a pulling action on the main opposite faces of the strip “S”. In other words, the counter-rotating rollers cooperate with each other in such a way that the strip “S” be interposed between them, with its main opposite faces of the strip “S” in contact with the rollers. In other words, the counter-rotating rollers form part of the puller.

Preferably, one of the two rollers is operatively associated with a motor 405 (i.e. motor means) by which it is driven in rotation to constitute a power-driven roller 404. Preferably, the power-driven roller 404 does not have any axial mouldings, such as knurling for example, to prevent imparting lateral movements to the strip. Preferably, the other of the two rollers is passively driven in rotation, that is to say, it constitutes an idle roller 403.

For example, the power-driven roller 404 is driven in rotation by a belt 405*a* to which it is operatively connected to receive motion. More specifically, it should be noted that the belt 405*a* is operatively associated with a pair of pulleys 406*a*, 406*b*, at least one of which 405*b* is connected to the motor 405.

The unwinding unit 400 comprises diverter 407 configured to divert the strip “S” between an initial, preferably horizontal, stretch “P1” of the feed path “P” and a final, substantially vertical stretch “P2” of the feed path. A curved, connecting stretch “P3” is thus defined between the initial stretch “P1” and the final stretch “P2”.

Figure 4:
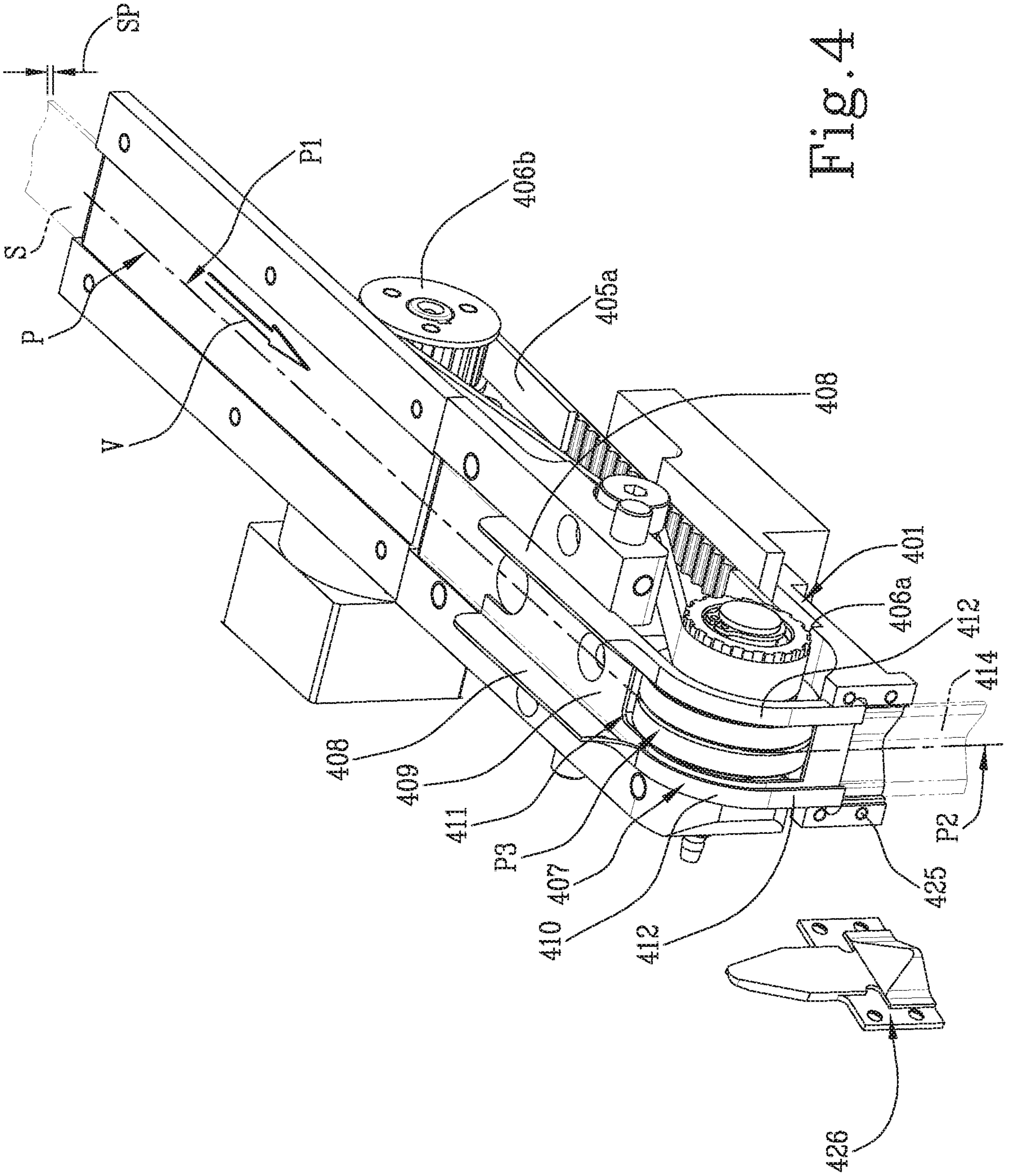
FIG. 4 is a partly exploded view, with some parts removed in order to better illustrate others, showing the unwinding unit of FIG. 2 from a different angle.

The diverter 407 comprise a pair of side guide plates 408 for directing the sides of the strip “S” and a flat supporting and sliding surface 409 which supports the strip “S” as it slides forward (FIG. 4).

It should be noted that the diverter 407 are structured to guide the heat-sealing strip “S” horizontally along the initial stretch “P1”, that is, parallel to the base 202 of the box 100, and vertically along the final stretch “P2”. More specifically, it should be noted that the diverter 407 have a connecting portion 410 suitably shaped to change the feed direction of the strip from horizontal to vertical.

It should be noted that the “S” exits the diverter 407 vertically.

The flat supporting and sliding surface 409 for the strip “S” has an opening 411 at the connecting portion 410. It should be noted that it is through the opening 411 of the flat supporting and sliding surface 409 that the puller 402 (that is, the two rollers 403 and 404) operate on two opposite faces of the strip “FS”.

The connecting portion 410 also has a pair of guide elements 412 for the top face of the strip “S” and shaped to allow directing and guiding the strip “S” along the curved stretch “P3” of the feed path “P”.

The unwinding unit 400 comprises deformer 413 operatively associated with the casing 401 and configured to make on the strip “S” an extended crease line 414 running along the strip itself starting from the curved stretch “P3” or downstream of the curved stretch “P3”, in the feed direction “V” of the strip “S”. In other words, the deformer 413 act on opposite faces of the strip “S” to deform the strip in the direction of its thickness “SP” in such a way as to create the crease line 414 lengthways along the strip “S” This deformation gives the strip “B” greater stiffness, preventing misshaping and keeping the strip “S” in a stable position when it hangs down vertically free from mechanical constraints. This prevents the free portion of the strip from moving out of position relative to the corner edge 102, that is, prevents its swinging and causing problems during the heat sealing operation.

Preferably, the deformer 413 are configured to deform the strip “S” along its centre line, thereby dividing it lengthways into two equal portions.

In the case where the puller 402 comprise the pair of counter-rotating rollers 403, 404, the deformer 413 may advantageously comprise this pair of counter-rotating rollers.

For example, one of the two rollers of the pair has an annular protrusion 415 which is coaxial with the roller itself and the other roller of the pair of counter-rotating rollers has an annular groove 416 which is coaxial with the roller itself (FIG. 7). in the example illustrated, the idle roller 403 has the annular protrusion 415 and the power-driven roller 404 has the annular groove 416.

The annular protrusion 415 and the annular groove 416 interpenetrate each other at the feed path "P" to produce the crease line 414 on the strip. It should be noted that the strip "S" is deformed—by squeezing—between the annular protrusion 415 and the annular groove 416.

It should also be noted that the edge of the annular protrusion 415 which comes into contact with the strip "S" is, radially, substantially rounded, shaped in such a way as not to tear the strip during its deformation by squeezing.

Preferably, the pair of counter-rotating rollers 403, 404 is located at the curved stretch "P3" of the feed path "P", preferably in a transit zone between the initial stretch "P1" and the curved stretch. "P3".

According to a possible embodiment, a non-limiting example of which is illustrated, one roller of the pair of counter-rotating rollers, preferably the idle roller 403, is mounted to rotate on a holder.

In one embodiment, the holder includes at least one arm 418. In one embodiment, the at least one arm 418 may be hinged to the casing 401.

In one embodiment, the holder includes a fork 417 comprising two arms 418. These two arms may be hinged to the casing 401 of the unwinding unit on opposite sides of the casing itself relative to the feed path "P" of the strip S".

In one embodiment, the holder is mounted so it has axial play relative to the casing 401.

In one embodiment, the at least one arm 418 is mounted so it has axial play relative to the casing 401.

Preferably, the fork 417 is mounted so it has axial play relative to the casing 401.

In one embodiment, the holder comprises an adjuster structure, for adjusting the axial position of the roller mounted thereon. "Axial" means along the axis (of rotation) of the roller.

In one embodiment, each one of the counter-rotating rollers may be adjusted in its axial position.

In one embodiment, one or both of the counter-rotating rollers may be idly movable axially between a first end position and a second end position axially displaced from the first end position.

Figure 7:
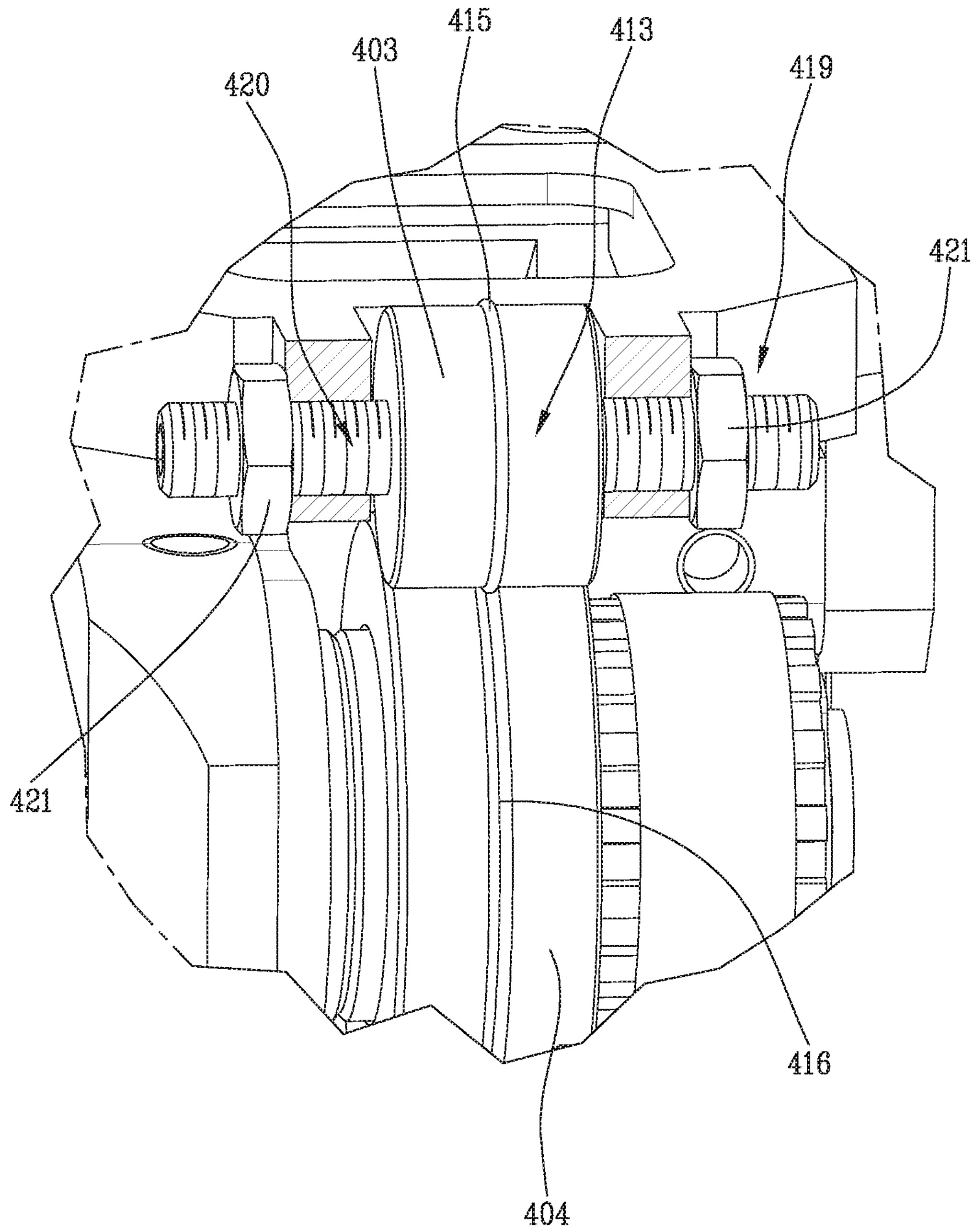
FIG. 7 shows a detail of the unwinding unit of FIG. 2 partly in cross section.

In one embodiment, the fork 417 comprises an adjuster structure 419, for adjusting the axial position of the roller mounted thereon (FIG. 7). For example, as illustrated in FIG. 7, the fork 417 comprises a pin 420 defining the axis of rotation of the respective roller, in particular the idle roller 403. The pin 420 is externally threaded and associated with a tightener (e.g. tightening means), for example nuts 421, suitable for adjusting the axial position of the pin 420 relative to the fork 417.

Figure 5:
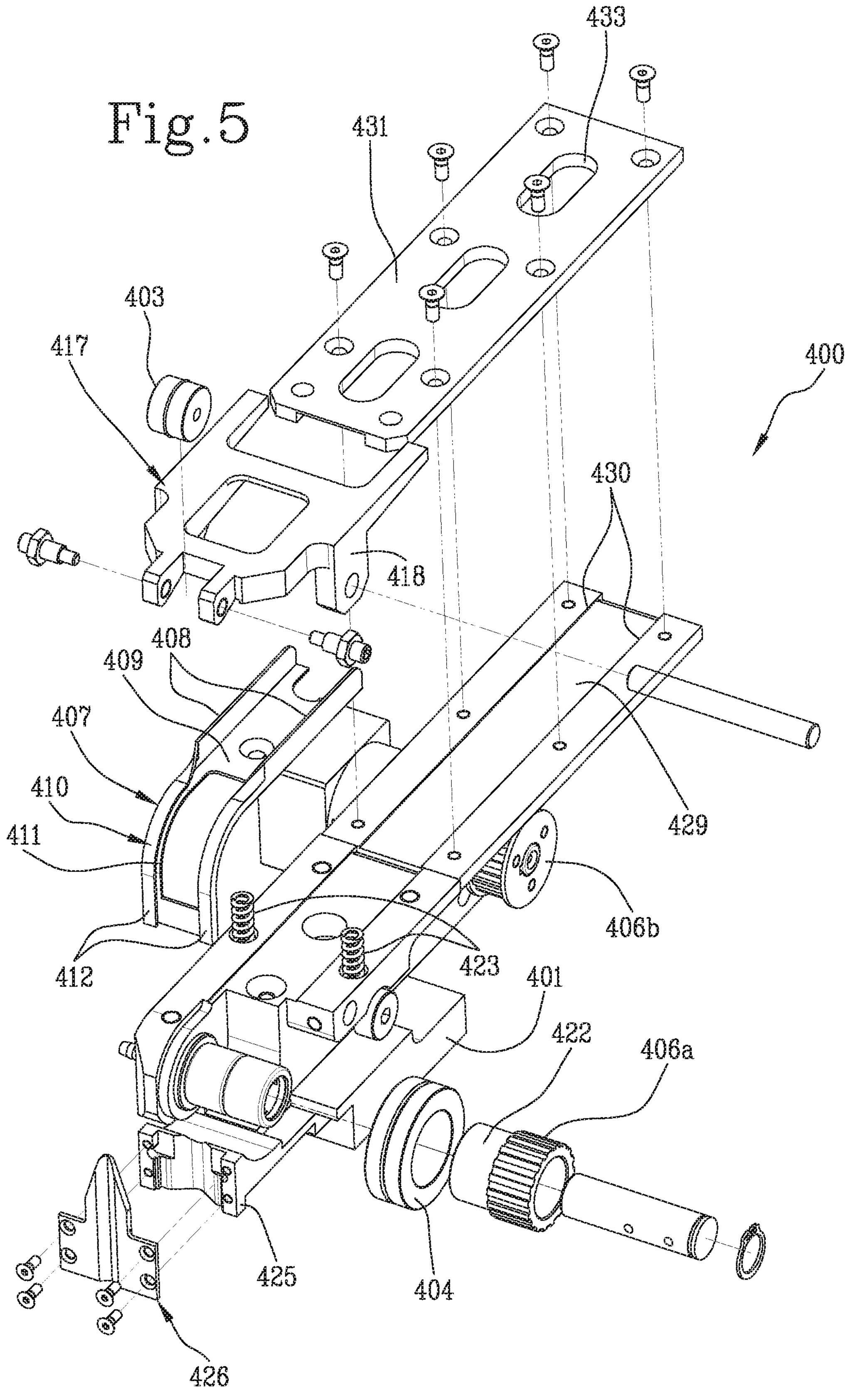
FIG. 5 shows the unwinding unit of FIG. 2 from a different angle and in an exploded view.

Preferably, the other roller, for example the power-driven roller 404, is mounted to rotate on the casing 401 and so it has axial play relative to the casing itself in order to adapt to the position of the idle roller 403. For example, the power-driven roller 404 is fitted to a shaft 422 which drives it in rotation and has axial play along the shaft 422 (FIG. 5).

Once adjusted, the power-driven roller remains stable by effect of the coupling with the idle roller and with the belt 405*a*.

Preferably, one or more springs 423 (or any other elastic means) are provided which are operatively associated with at least one of the counter-rotating rollers in order to apply a thrust force which keeps the counter-rotating rollers in contact with the strip "S". For example, the spring 423 is operatively associated with the idle roller 403. In the example illustrated, the spring 423 is located between the fork 417 and the casing 401 to cause the idle roller 403 to apply a thrust force to the top surface of the strip "S" (FIG. 5).

Preferably, an outfeed guide 424 is provided which is configured to guide the strip "S" along at least a portion of the final stretch "P2" of the feed path "P" and to position a portion of the strip to vertically face the corner edge 102 of the box 100.

Figure 6:
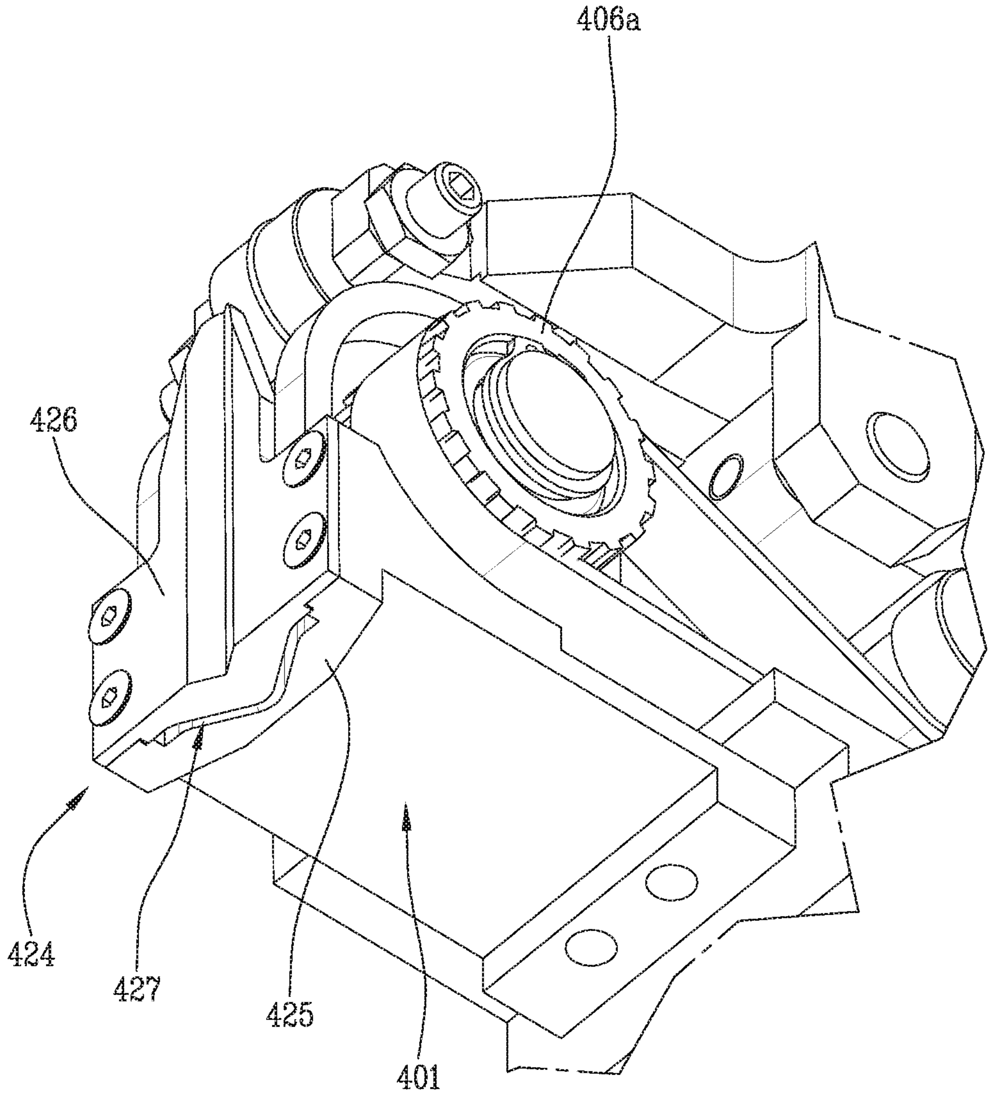
FIG. 6 shows a detail of the unwinding unit of FIG. 2 from a different angle.

In an example embodiment, the outfeed guide 424 comprise a portion 425 of the casing 401 and a block 426 fixed to the casing in such a way as to define between them a through gap 427 for the passage of the strip "S" extending along the final stretch "P2" of the feed path "P. Preferably, the portion 425 of the casing 401 and the block 426 are configured to define a through gap 427 which has the shape of a V at least in middle stretch of it relative to the width of the strip "S" (FIG. 6).

Figure 8:
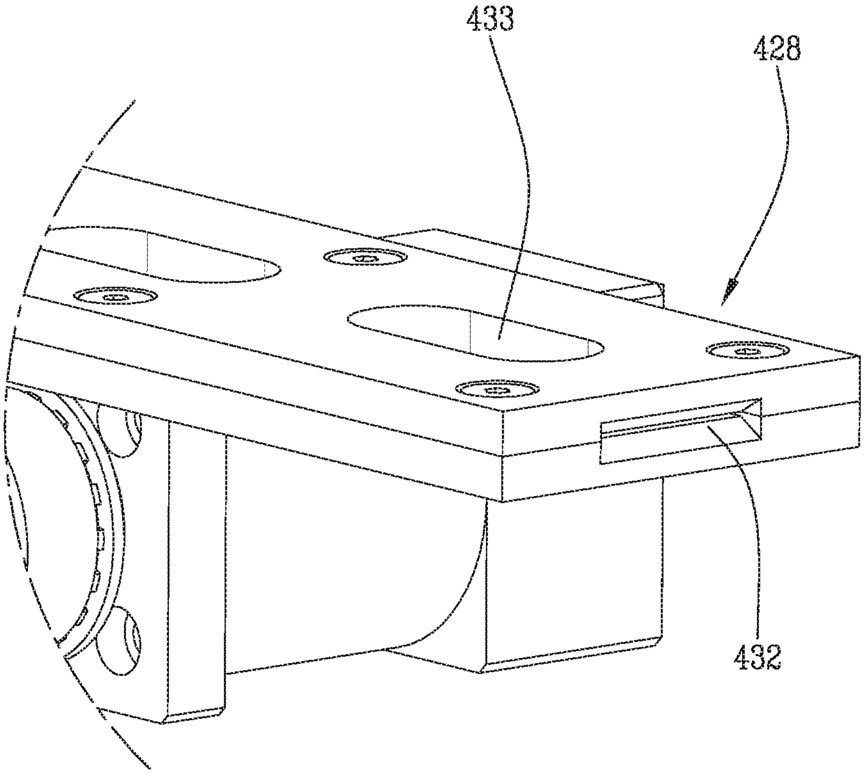
FIG. 8 shows a detail of the unwinding unit of FIG. 2 from a different angle.

Preferably, an infeed guide 428 is provided which is configured to guide the strip "S" along at least a portion of the initial stretch "P1" of the feed path "P". For example, the infeed guide 428 comprise a flat sliding surface 429, two side containment walls 430 and a cover plate 431, positioned in such a way as to define a through gap 432 for the strip "S" extending along the initial stretch "P1" of the feed path "P". The cover plate 431 preferably has at least one slot 433 (FIG. 5 and FIG. 8).

Described below is the operation of the unwinding unit and of the machine with reference in particular to one corner edge 102 of a box 100.

The strip "S" is pulled by the rollers 403, 404 and fed along the feed path "P". More specifically, the strip "S" is unwound from a roll of continuous material.

It should be noted that the two counter-rotating rollers which pull the strip "S" also cause it to be deformed as they pull it.

More specifically, the deformation of the strip "S" is in the direction of the thickness "SP" of the strip itself. In effect, as the strip "S" is pulled, a part of it is squeezed between the annular protrusion 415 and the annular groove 416.

Preferably, the deformation is continuous (that is to say, a crease line 414 is made all along the strip "S", uninterruptedly).

It should be noted that a deformed portion of the strip "S" projects downwardly below the unwinding unit 400 for a predetermined length (depending on the box size being used).

This portion of the strip is free of constraints and is interposed between the corner edge 102 and the sealing head.

The fact that the strip is deformed at the curved stretch, or downstream of it, advantageously makes it possible to prevent unwanted swinging or bending of the free portion of the strip, without negatively affecting the pulling action and thus allowing the strip to be kept at a predetermined position relative to the corner edge 102 of the box 100.

This aspect is particularly important in a strip of reduced thickness which, by its very nature, tends to bend or curl if left vertically unconstrained.

In this configuration, therefore, the sealing head precisely heat seals the portion of the strip "S" to the adjacent side segments. It should be noted that the portion of the strip "S" is cut off in customary manner, not described, to obtain the piece 300. The piece 300 holds the segments 204 together and seals the corner edge 102.

The fact that the strip "S" is thin prevents an unattractive indentation from being formed at the corner edge 102, and, thanks to the crease line, it is possible to form boxes which are particularly tall, thus making it possible to guarantee a high degree of flexibility in terms of box sizes.

It should be noted that using a particularly thin strip of material combined with the fact of deforming it as described above advantageously allows making high-quality premium boxes where the heat sealing strip is not visible (because it is very thin) and where, at the same time, correctly applying the strip to the corner edges of the box is guaranteed.

Also defined is a method for unwinding a strip "S" of heat sealing material suitable for sealing the edges of side segments of a box forming blank juxtaposed to define a corner edge of the box. The method makes the strip stiffer without interfering with the system by which the strip is fed.

The method comprises the step of pulling the strip "S" along a feed path "P" and in a feed direction "V", diverting it between an initial, preferably horizontal stretch "P1" of the feed path and a final, preferably vertical stretch "P2", defining a curved connecting stretch "P3" between the initial stretch and the final stretch.

The method also comprises the step of making on the strip "S" an extended crease line 414 running along the strip itself starting from the curved stretch "P3" or downstream of the curved stretch "P3", in the feed direction "V" of the strip "S".

The crease line 414 is made by the very system which feeds the strip "S" and concurrently with the operation thereof.

The method may also comprise the step of folding the strip "S" into a V shape with vertex in the crease line 414, guiding the strip "S" as it leaves the feed path "P". In one embodiment, the crease line 414 positioned centrally relative to the width of the strip "S".

Preferably, the position of the crease line 414 relative to the width of the strip "S" can be adjusted. Preferably, the strip "S" is guided as it enters the feed path "P".

Also defined according to this description is a method for forming a cardboard box from a flat forming blank having a base and a plurality of side segments which can be folded relative to the base in such a way that edges of adjacent side segments define vertical corner edges of a side wall of the box.

A strip "S" is unwound according to the unwinding method described above in order to position a portion of the strip "S" of predetermined length vertically to face each of the corner edges of the box.

Each portion of the strip is heated and pressed against the corresponding corner edge in order to heat seal it to, and thereby close, the corner edge itself.

What is claimed is:

1. An unwinding unit for unwinding a strip of heat sealing material for quadrangular machine for forming boxes from blanks of paper or cardboard, each blank having a base and a plurality of segments connected to the base, the unwinding unit comprising:

a casing mounted on the quadrangular machine;

a puller, associated with the casing and configured to pull the strip relative to the casing along a feed path and in a feed direction; a pair of counter-rotating rollers, configured and effective to act as a deformer to make a crease line on the strip as the strip is passing between the pair of counter-rotating rollers;

a diverter, configured to divert the strip between an initial, horizontal stretch of the feed path and a final, vertical stretch of the feed path oriented in a vertical direction perpendicular to the feed direction, wherein the diverter extends between an inlet portion, oriented horizontally and receiving the strip at the initial, horizontal stretch of the feed path, an outlet portion, oriented vertically and delivering the strip at the final, vertical stretch of the feed path, and an intermediate portion, located between the inlet portion and the outlet portion, the intermediate portion having a curve shape to define a curved, connecting stretch between the initial stretch and the final stretch, wherein the rollers of the pair of counter-rotating rollers are thrusted one against the other through a force which keeps said counter-rotating rollers (A) in contact with the strip passing therebetween, and (B) pushed one against the other, wherein the pair of counter-rotating rollers is located in a transit zone between the initial, horizontal stretch of the feed path and the final, vertical stretch of the feed path, the unwinding unit further comprising a body located downstream of the diverter with respect to the feed path, the body providing an outfeed guide, to guide the strip along an end portion of the final stretch of the feed path and to position a portion of the strip to vertically face a corner edge of a box, wherein the body extends vertically between an upper end and a lower end and is internally provided with a through gap, the strip sliding in the through gap, wherein the through gap extends vertically from a gap inlet to a gap outlet located at the location where the strip exits the through gap, wherein the body has a bottom face laying in a horizontal plane perpendicular to the vertical direction, the bottom face defining the lower end of the body and elongating in a transversal direction, perpendicular to the vertical direction and to the feed direction, and wherein the outlet of the through gap is located at the bottom face of the body, at the location where the strip exits the outfeed guide, and has a "V" shape, with a concavity oriented in the feed direction; wherein said body includes an inner portion and an outer portion removably fixed to one another and providing a recess and a protrusion, the recess and the protrusion being counter-shaped and spaced one from the other to form the "V" shaped through gap.

2. The unwinding unit according to claim 1, wherein at least one of the rollers is operatively associated with a motor, wherein the rollers are mounted with their axes of rotation transverse to the feed path and respectively on opposite sides of the feed path in such a way as to apply a pulling action on the main opposite faces of the strip.

3. The unwinding unit according to claim 1, wherein one of the rollers of the pair of counter-rotating rollers has an annular protrusion which is coaxial with the roller itself and the other roller of the pair of counter-rotating rollers has an annular groove which is coaxial with the roller itself, the annular protrusion penetrating the annular groove at the feed path, while the strip is being fed, in order to produce the crease line on the strip.

4. The unwinding unit according to claim 1, wherein one roller of the pair of counter-rotating rollers is mounted to rotate on a fork comprising two arms which are hinged to the casing of the unwinding unit on opposite sides of the casing itself relative to the feed path of the strip.

5. The unwinding unit according to claim 4, wherein the fork is mounted so it has axial play relative to the casing and/or wherein the fork comprises an adjuster structure for adjusting the axial position of the roller mounted thereon.

6. The unwinding unit according to claim 5, wherein the other roller of the pair of counter-rotating rollers is mounted to rotate on the casing and so it has axial play relative to the casing in order to adapt to the position of the roller mounted on the fork.

7. The unwinding unit according to claim 6, wherein the other roller of the pair of counter-rotating rollers is a power-driven roller.

8. The unwinding unit according to claim 1, wherein the outfeed guide comprises a portion of the casing and a block fixed to the casing in such a way as to define between them the through gap for the strip extending along the final stretch of the feed path.

9. The unwinding unit according to claim 8, wherein the portion of the casing and the block are configured to define the through gap so that the through gap has the “V” shape, at least in a middle stretch of the through gap relative to the width of the strip.

10. The unwinding unit according to claim 1, comprising an infeed guide configured to guide the strip along at least a portion of the initial stretch of the feed path and comprising a flat sliding surface, two side containment walls and a cover plate positioned in such a way as to define a through gap for the strip extending along the initial stretch of the feed path.

11. The unwinding unit according to claim 1, wherein one roller of the pair of counter-rotating rollers is rotatably mounted on a holder connected to the casing and is axially movable from a first position to a second position, axially displaced along a rotation axis of the roller.

12. The unwinding unit according to claim 1, wherein one roller of the pair of counter-rotating rollers is rotatably mounted on a holder connected to the casing, and wherein the holder is mounted so it has axial play relative to the casing.

13. The unwinding unit according to claim 1, wherein the pair of counter-rotating rollers is configured to pull the strip relative to the casing along a feed path and in a feed direction, so that the pair of counter-rotating rollers constitute the puller.

14. The unwinding unit according to claim 1, wherein the through gap elongates in the vertical direction for a length, from the gap inlet to the gap outlet, wherein the outfeed guide includes the “V” shape for the whole length of the outfeed guide.

15. The unwinding unit according to claim 1, wherein the outfeed guide defines a vertically-extending groove which is sized and positioned so that the groove can accommodate a corner edge of a box being processed.

16. The unwinding unit according to claim 1, wherein said body includes an inner portion and an outer portion removably fixed to one another and providing a recess and a protrusion, the recess and the protrusion being counter-shaped and spaced one from the other to form the “V” shaped through gap.

* * * * *